Sept. 5, 1967   J. H. SNYDER   3,340,480
MAGNETIC OSCILLATOR APPARATUS HAVING MEANS
FOR MINIMIZING NONLINEARITIES IN
THE SQARE WAVE OUTPUT
Filed March 4, 1965

INVENTOR.
JAMES H. SNYDER
BY
Roger W. Jensen
ATTORNEY

United States Patent Office 3,340,480
Patented Sept. 5, 1967

3,340,480
MAGNETIC OSCILLATOR APPARATUS HAVING MEANS FOR MINIMIZING NONLINEARITIES IN THE SQUARE WAVE OUTPUT
James H. Snyder, Minnetonka, Minn., assignor to Honeywell Inc., a corporation of Delaware
Filed Mar. 4, 1965, Ser. No. 437,227
9 Claims. (Cl. 331—113)

ABSTRACT OF THE DISCLOSURE

A free running multi-vibrator including control means to detect nonlinearities in the square wave output and to minimize these nonlinearities through a feedback system.

Figure 1:
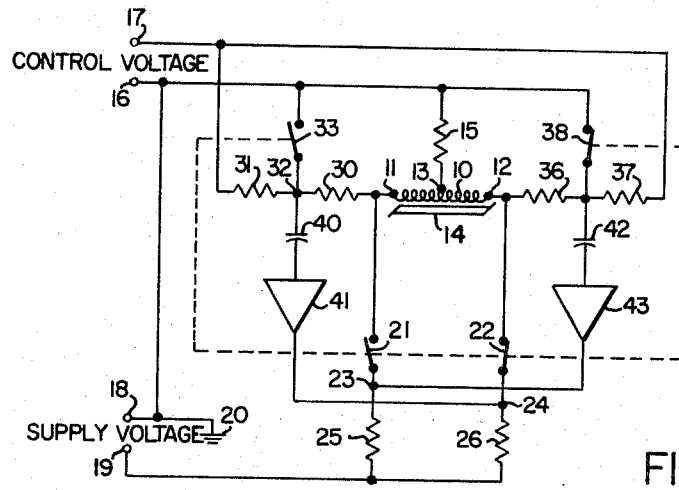

The present invention pertains to oscillators and more particularly it pertains to magnetic oscillators whose frequency is precisely related to the magnetic core characteristics.

The magnetic oscillator is basically a free running multi-vibrator, rather than a linear oscillator dependent upon resonance phenomenon. The period of oscillation is determined by an applied voltage, and the saturation flux level of a square loop magnetic core. The uniformity of oscillation is determined by the familiar induction law which states that the voltage across a winding is directly proportional to the rate of change of magnetic flux. Any resistance in a winding or in the generator supplying the voltage to the winding will cause errors which result from the characteristic nature of the hysteresis loop of the core. As a result of this resistance, the waveform of an oscillator is not square, but wiggles appear in the horizontal parts of the waveform which increase as the resistance in series with the driving voltage increases. The present invention provides means for sensing these errors and provides feedback means through which these errors may be applied back to the conducting transistor for the purpose of cancelling these errors from the output of the oscillator.

A circuit representative of the invention is comprised of a center tap winding on a magnetic saturable core. The center tap of the winding is connected to one terminal of a DC voltage supply source. A pair of transistors respectively connect the two ends of the winding to the other terminal of the voltage supply source. During one-half of the cycle a current path is traced from the first terminal of the voltage source through one-half of the winding, from the center tap to the end, and through one of the transistors to the other terminal of the source. This current flow continues until the core associated with the winding saturates, whereupon the conducting transistor is switched off and the previously non-conducting transistor is turned on, commencing the second half of the cycle. During this portion of the operation the current path may be traced from one end of the supply voltage source through the alternate half of the winding and through the now conducting transistor to the second terminal of the supply voltage source. During each half of the cycle the main operating current flows through only one-half of the winding and through one transistor, while the other transistor is in the non-conducting state and the other half of the winding carries only a small current. During each half of the cycle of the oscillator, therefore, a voltage is impressed on one-half of the winding to cause the flux to change in the core. The half of the winding, which is not being driven, has a voltage induced in it by the changing flux linkage. This induced voltage across the non-conducting portion of the winding contains the information as to any undesirable voltage variations across the conductive portion of the winding and provides the error signal which may be used for corrective action.

It is considered to be an important feature of the present invention that the error signal is obtained from a non-conducting portion of the winding. This voltage is applied through a high gain amplifier and is used to control the current of the conducting transistor. During each half cycle the voltage signal from the non-conducting portion of the winding is used to control the voltage across the conducting portion of the winding.

Another important feature of the present circuit which distinguishes it from the prior art magnetic oscillators is that switching transistors are biased such that they are never in the saturated state. This, of course, is an essential feature of the present circuit since it allows the control of the transistor currents through the feedback amplifier chain. Ideally, non-linearities would be completely eliminated if the gain in the control loop could be made to approach infinity. The feasible gain in the loop is limited by core reactances which tend to make the loop unstable, resulting in a tendency for high frequency oscillations. This limitation means that further improvement in linearity must be accomplished by other means. It has been found experimentally that the needed compensating effect may be obtained by placing a small value of resistance in series with the windings in such a manner as to increase the error voltage fed back as current increases. This has been successfully accomplished by placing the small value resistor between the center tap of the winding and the one terminal of the supply voltage source.

It is therefore an object of the present invention to provide an improved magnetic oscillator.

It is a further object of this invention to provide a magnetic oscillator with a highly linear output square wave signal whose amplitude and frequency are the function of only the applied voltage and the saturation flux level of the square loop magnetic core.

Figure 2:
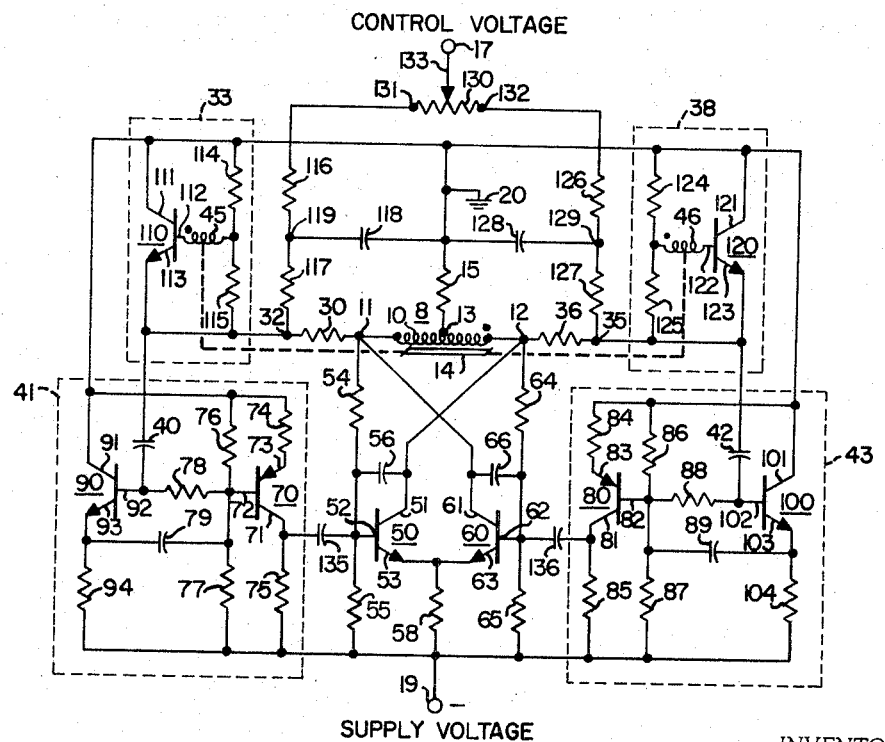

These and further objects will become apparent to those skilled in the art upon inspection of the following specification, claims, and drawing in which:

FIGURE 1 is a simplified schematic diagram of the magnetic amplifier of the present invention; and FIGURE 2 is a detailed schematic diagram of the present invention which has been successfully reduced to practice.

Referring now to FIGURE 1, there is shown a winding 10 having end terminals 11 and 12 and an intermediate tap 13. Winding 10 is placed on a square hysteresis loop core 14. The circuit has a pair of input terminals 18 and 19 for connection to a supply voltage source of a control voltage. Intermediate tap 13 is connected to a ground 20 and also to input terminals 16 and 18 through a small resistance 15. End terminal 11 of winding 10 is connected to input terminal 19 through a switch 21 in series with resistor 25, and end terminal 12 of winding 10 is connected to input terminal 19 through a switch 22 in series with a resistor 26. End terminal 11 is also connected to control voltage input terminal 17 through a series connection to resistors 30 and 31 and end terminal 12 is also connected to control voltage input terminal 17 through a series network of resistors 36 and 37.

A junction 32 between series resistors 30 and 31 is connected to ground 20 through a switch 33 and is also connected to a junction point 24 between switch 22 and resistor 26 through a series network of a capacitor 40 and an amplifier 41. A junction point 35 between series resistors 36 and 37 is connected to ground 20 through a switch 38 and is further connected to a junction point 23 between switch 21 and resistor 25 through a series network of a capacitor 42 and an amplifier 43.

FIGURE 2 shows the same circuit shown in FIGURE 1, but in detail. A transformer 8 has a center tapped primary winding 10 with end terminals 11 and 12 and intermediate tap 13. Transformer 8 further has secondary windings 45 and 46. The windings of transformer 8 are on a square hysteresis loop core 14. Intermediate tap 13 of winding 10 is connected to a ground terminal 20 through a small resistor 15. End terminal 11 of winding 10 is connected directly to a collector electrode 61 of a transistor 60 and is also connected to a base electrode 52 of a transistor 50 through a resistor 54. Transistor 60 further has a base electrode 62 and an emitter electrode 63, and transistor 50 further has a collector electrode 51 and an emitter electrode 53. End terminal 12 of winding 10 is connected directly to collector electrode 51 of transistor 50 and also through a resistor 64 to base electrode 62 of transistor 60. Emitter electrodes 53 and 63 of transistors 50 and 60 respectively are connected together and also through a resistor 58 to a terminal 19 which is at a negative potential. Base electrodes 52 and 62 are connected to terminal 19 through resistors 55 and 65 respectively. A capacitor 56 is connected between base electrode 52 and collector electrode 51 of transistor 50 and a capacitor 66 is connected between base electrode 62 and collector electrode 61 of transistor 60.

End terminal 11 is connected to a terminal 131 of a potentiometer 130 through a series network of a resistor 30, a junction 32, a resistor 117, a junction 119, and a resistor 116. Potentiometer 130 further has another terminal 132 and a wiper 133. End terminal 12 of winding 10 is connected to terminal 132 of potentiometer 130 through a series network of a resistor 36, junction 35, a resistor 127, a junction 129, and a resistor 126. Wiper 133 of potentiometer 130 is connected directly to a terminal 17 which may be connected to a source of control voltage. A capacitor 118 is connected between ground 20 and junction 119 between resistors 116 and 117 and a capacitor 128 is connected between ground 20 and junction 129 between resistors 126 and 127.

Junction 32 between resistors 30 and 117 is connected directly to an emitter electrode 113 of a transistor 110 and also through a capacitor 40 to a base electrode 92 of a transistor 90. Transistor 110 further has a collector electrode 111 and a base electrode 112. Transistor 90 further has a collector electrode 91, and an emitter electrode 93. A series network comprised of resistor 114 and 115 is connected between collector electrode 111 and emitter electrode 113 of transistor 110. Secondary winding 45 of transformer 8 has one of its ends connected to the junction between resistors 114 and 115 and has its other end connected to base electrode 112 of transistor 110.

Collector 91 of transistor 90 is connected to ground terminal 20 and emitter 93 is connected to terminal 19 through a resistor 94. Base electrode 92 of transistor 90 is connected to a base electrode 72 of a transistor 70 through a resistor 78. Transistor 70 has a collector electrode 71, a base electrode 72 and an emitter electrode 73. A resistor 76 is connected between base electrode 72 of transistor 70 and ground terminal 20, a resistor 77 is connected between base electrode 72 and negative potential terminal 19, and a capacitor 79 is connected between base electrode 72 of transistor 70 and emitter electrode 93 of transistor 90. A resistor 74 is connected between emitter electrode 73 of transistor 70 and ground potential terminal 20 and a resistor 75 is connected between collector electrode 71 and negative potential terminal 19. Collector electrode 71 of transistor 70 is further connected to base electrode 52 of transistor 50 by means of a capacitor 135.

Junction 35 between resistors 36 and 127 is connected directly to an emitter electrode 123 of a transistor 120 and also to a base electrode 102 of a transistor 100 through a capacitor 42. Transistor 120 also has a collector electrode 121 and a base electrode 122. Base electrode 122 of transistor 120 is connected to one end of secondary winding 46 of transformer 8. The other end of secondary winding 46 is connected to collector electrode 121 of transistor 120 through a resistor 124 and is connected to emitter terminal 123 through a resistor 125. Collector 121 is connected directly to ground potential terminal 20.

A collector electrode 101 of transistor 100 is connected directly to ground potential terminal 20 and an emitter electrode 103 of transistor 100 is connected to negative potential terminal 19 through a resistor 104. Base electrode 102 of transistor 100 is connected to a base electrode 82 of a transistor 80 through a resistor 88. A capacitor 89 is connected between emitter electrode 103 of transistor 100 and base electrode 82 of transistor 80. Transistor 80 further has a collector electrode 81 and an emitter electrode 83. A resistor 86 is connected between base electrode 82 and ground potential terminal 20 and a resistor 84 is connected between emitter 83 and ground potential terminal 20. A resistor 87 is connected between base electrode 82 and negative potential terminal 19 and a resistor 85 is connected between collector electrode 81 and negative potential terminal 19. Collector electrode 81 of transistor 80 is further connected to base electrode 62 of transistor 60 by means of capacitor 136.

*Operation*

The operation of the oscillator may be best explained by referring to FIGURE 1. Assuming that the condition of the circuit is as shown in FIGURE 1 whereby switches 22 and 38 are closed and switches 21 and 33 are open, a current path may be traced from ground potential 20 through resistor 15, through winding 10 from center tap 13 to end terminal 12, through switch 22, and through resistor 26 to negative potential terminal 19. The flow of current along this path continues until core 14 associated with winding 10 saturates, whereupon switches 22 and 38 open and switches 21 and 33 close. A second half of the cycle now commences during which the current path may be traced from ground potential terminal 20 through resistor 15, through winding 10 from center tap 13 to end terminal 11, through now closed switch 21 and through resistor 25 to negative potential terminal 19.

The output signal in FIGURE 1 may be taken between a number of points in the circuit. It could be taken, for example, between end terminals 11 and 12 of winding 10, or between end terminal 11 and negative potential terminal 19, or between end terminal 12 and negative potential terminal 19, or between ground potential terminal 20 and either one of the end terminals 11 or 12. Also a separate winding for this purpose could be utilized.

During the portion of the cycle when switches 22 and 38 are closed and switches 21 and 33 are open the current flows as indicated above. During this time almost all of the supply voltage appears between center tap 13 and end terminal 12 of winding 10 with the exception of small voltage drops across small resistors 15 and 26. Eventually core 14 saturates causing a sudden decrease in impedance between center tap 13 and end terminal 12 and causing switches 20 and 38 to open and switches 21 and 33 to close. The second half of the cycle commences with the portion of the winding between center tap 13 and end terminal 11 being driven from the supply voltage until core 14 saturates in the reverse direction and the cycle repeats. The oscillator thus provides a square wave output.

Due to non-ideal shape of the hysteresis loop of saturable core 14 and due to inherent resistance in winding 10 or in the generator supplying the voltage to the winding, errors will be introduced which will distort the square wave output of the oscillator, causing wiggles to appear in the horizontal parts of the waveform. These distortions increase as the resistance in series with the driving voltage increases. While the driving voltage is applied between center tap 13 and terminal 12 and the main current flows through this half of the winding, voltage is induced across the other half of the winding due to the auto-transformer effect. This induced voltage between center tap 13 and end terminal 11 contains the information as to the undesirable voltage variations across the conductive portion of the winding and provides a feedback signal which is used to control the amplitude of the voltage across the conductive half of the winding. This feedback signal is taken from end terminal 11 and applied to the input of amplifier 41 through resistor 30 and capacitor 40. The amplifier feedback signal is then applied to junction 24 which is connected directly to end terminal 12 of winding 10 when switch 22 is closed. Since switch 22 is closed and the current flows from the center tap 13 to end terminal 12, the center tap is at positive potential with respect to end terminal 12. The induced voltage on the other half of the winding causes end terminal 11 to be at positive potential with respect to center tap 13. The control voltage applied between terminals 17 and 16 causes a current to flow from terminal 16 through resistor 15 and through winding 10 from tap 13 to end terminal 11, through resistor 30, junction 32, and resistor 31 back to terminal 17 and also through winding 10 from tap 13 to end terminal 12, resistor 36, junction 35, and resistor 37 to terminal 17. Control voltage between terminals 16 and 17 is selected to be of such a magnitude that when the voltage between tap 13 and end terminal 12 is of a proper magnitude, junction 32 is at ground potential. If now the induced voltage between tap 13 and terminal 11 increases this increase will be reflected in higher voltage at junction 32. This voltage increase is applied through capacitor 40 to amplifier 41 and a voltage from the output of amplifier 41 is added to the voltage at end terminal 12 effectively raising the potential of end terminal 12 and moving it closer to the potential at center tap 13, thereby decreasing the induced potential between tap 13 and terminal 11. It can be seen from the above discussion that a change in control voltage between terminals 16 and 17 will control the rate of change of flux linking the winding half between tap 13 and end terminal 11 changing the frequency of the oscillator.

It will be noted that during the portion of the cycle described so far switch 38 has been closed, thus removing any feedback signal from the input of amplifier 43 at junction 35 by connecting junction 35 to ground potential terminal 20. At the same time switch 33 has been opened allowing the feedback signal to amplifier 41.

Should the voltage induced in the winding between tap 13 and terminal 11 decrease to a value below normal, then the voltage at junction 32 will reduce to below ground potential and a voltage will be subtracted from the voltage at end terminal 12, thereby increasing the voltage induced between tap 13 and terminal 11 of the winding. The circuit is precisely symmetrical and the description of operation above applies equally well to the alternate half of the cycle when switches 21 and 33 are closed and switches 22 and 38 are open, with the difference, of course, that the main current now flows through the winding between center tap 13 and end terminal 11 and the feedback signal is obtained from end terminal 12 and applied back to end terminal 11 through amplifier 43.

FIGURE 2 shows a detailed schematic diagram of the oscillator of FIGURE 1 which has been successfully reduced to practice. The switching function of switches 21 and 22 of FIGURE 1 is accomplished in FIGURE 2 by means of transistors 60 and 50 respectively. A bias network comprised of resistors 54, 55, 58, 64, and 65 establishes operating points for transistors 50 and 60 such that the two transistors never saturate. The switching function of switches 33 and 38 in FIGURE 1 is accomplished in FIGURE 2 by transistors 110 and 120 respectively with their associated networks including secondary windings 45 and 46 of transformer 8. The sense of windings 45 and 46 on core 14, with respect to winding 10, is such that the end of winding 45 connected to base 112 of transistor 110 is positive when end terminal 12 of winding 10 is positive with respect to end terminal 11, and the end of winding 46 connected to base 122 of transistor 120 is positive when end terminal 11 of winding 10 is positive with respect to end terminal 12. For example, when transistor 60 is conducting, end terminal 12 of winding 10 is positive with respect to end terminal 11 and winding 45 applies a positive potential to base 112, causing transistor 110 to conduct. This effectively grounds junction point 32 and removes the signal from the input of amplifier 41. At the same time winding 46 applies a negative potential to base electrode 122 of transistor 120, maintaining transistor 120 in a nonconducting state. The signal from junction 35 is allowed to pass onto the input of amplifier 43 and through amplifier 43 back to base 62 of transistor 60. With a reversed polarity of signal on winding 10 such that terminal 11 is positive with respect to terminal 12, transistor 110 is turned off and maintained off and transistor 120 is turned on, removing the signal from the input of amplifier 43 and allowing the feedback signal from junction point 32 to the input of amplifier 41.

The function of resistor 15 between center tap 13 and ground potential terminal 20 is to improve the linearity of the circuit. Its effect is to increase the error voltage fed back as the current increases. Potentiometer 130 allows fine adjustment of control voltage to be applied through the two symmetrical branches to end terminals 11 and 12 of winding 10. The function of control voltage has been explained with reference to FIGURE 1.

In a successful embodiment of the circuit in FIGURE 2, the following values were assigned to the circuit elements:

Resistors: Ohms
15 — 10
54 — 470K
64 — 470K
55 — 10K
65 — 10K
58 — 100
30 — 36.3K
36 — 36.3K
117 — 47.5K
127 — 47.5K
116 — 47.5K
126 — 47.5K
114 — 47
124 — 47
115 — 100K
125 — 100K
94 — 10K
104 — 10K
78 — 10K
88 — 10K
76 — 10K
86 — 10K
77 — 220K
87 — 220K
74 — 220
84 — 220
75 — 4.7K
85 — 4.7K
Potentiometer 130 — 1K Capacitors:
56 — farads — .004
66 — do — .004
79 — μfarads — 10
89 — do — 10
40 — do — 2
42 — do — 2
135 — do — 10
136 — do — 10

Rather than taking the feedback signal from the nonconducting portion of a center-tapped winding as shown here, it is possible to provide a separate sensing winding, the signal from which would be used to control the driving voltage or current to give a controlled rate of flux change in the core.

Many variations and embodiments are possible within the spirit of this invention. It is, therefore, understood that the specific embodiment of my invention shown here is for the purpose of illustration, and that my invention is limited only by the scope of the appended claims.

What is claimed is:

1. A magnetic oscillator comprising:
   a pair of input terminals for connection to a source of electric potential;
   magnetic timing means including a saturable core and a winding which includes first and second portions on said core;
   bistable switching means, connected to said winding and to said pair of input terminals for alternately driving the current through said winding in first and second directions, the direction of said current depending on the state of said bistable switching means;
   sensing means connected alternately to said first and second portions of said timing means for sensing flux changes in said core and providing a feedback signal indicative of the flux changes; and
   control means connected to said winding and adapted to receive said feedback signal from said sensing means for varying the voltage across the other portion of said winding from that portion which is connected to said sensing means and attaining a controlled rate of flux changes in the core.

2. A magnetic oscillator comprising:
   first and second input terminals for connection to a source of electric potential;
   magnetic timing means including a saturable core and a winding on said core, said winding having a pair of end terminals and an intermediate tap;
   bistable switching means, connected to said winding for connecting one or the other of said end terminals of said winding to said first input terminal, depending on the state of said bistable switching means;
   means, including a small resistance means, connecting said intermediate tap to said second input terminal;
   control means connected from each end terminal of said winding to the other end terminal for varying the voltage at each end terminal as a function of the voltage variations at the other; and
   a source of variable control voltage connected between the end terminals and the intermediate tap of said winding, whereupon a variation in said control voltage is effective to change the voltage across said winding and correspondingly change the frequency of the oscillator.

3. A magnetic oscillator comprising:
   first and second input terminals for connection to a source of electric potential;
   magnetic timing means including a saturable core and a winding on said core, said winding having a pair of end terminals and an intermediate tap;
   bistable switching means, connected to said winding for connecting one or the other of said end terminals of said winding to said first input terminal, depending on the state of said bistable switching means;
   means, including a small resistance means, connecting said intermediate tap to said second input terminal; and
   control means connected from each end terminal of said winding to the other end terminal for varying the voltage at each end terminal as a function of the voltage variations at the other.

4. A magnetic oscillator comprising:
   first and second input terminals for connection to a source of electric potential;
   magnetic timing means including a saturable core and a winding on said core, said winding having a pair of end terminals and an intermediate tap;
   bistable switching means, connected to said winding for connecting one or the other of said end terminals of said winding to said first input terminal, depending on the state of said bistable switching means;
   means, including a small resistance means, connecting said intermediate tap to said second input terminal;
   control means connected from each end terminal of said winding to the other end terminal for varying the voltage at each end terminal as a function of the voltage variations at the other; and
   a source of variable control voltage connected between the end terminals and the intermediate tap of said winding, whereupon a variation in said control voltage is effective to change the voltage across said winding and correspondingly change the frequency of the oscillator.

5. A magnetic oscillator comprising:
   first and second input terminals for connection to a source of electric potential;
   magnetic timing means including a saturable magnetic core and a winding on said core having first and second end terminals and an intermediate tap;
   means connecting said intermediate tap of said winding to said first input terminal;
   a first and a second switching means each having a variable impedance conductive state and a nonconductive state, each said switching means having an input, an output, and a control means;
   means connecting the output means of said first and said second switching means to said second input terminal;
   means connecting the input means of said first switching means to the first end terminal of said winding, and means connecting the input means of said second switching means to the second end terminal of said winding;
   network means interconnecting said switching means and said winding such that during the operation of the oscillator one of said two switching means is in its conductive state and the other of said switching means is in its nonconductive state and upon saturation of said magnetic core said two switching means assume their alternate states;
   a first amplifier means having an input connected to receive a voltage signal from the second end terminal of said winding when said first switching means is in its conductive state, and having an output connected to the control means of said first switching means to vary the impedance of said first switching means as a function of the voltage appearing at said second end terminal; and
   a second amplifier means having an input connected to receive a voltage signal from the first end terminal of said winding when said second switching means is in its conductive state, and having an output connected to the control means of said second switching means to vary the impedance of said second switching means as a function of the voltage appearing at said first end terminal.

6. A magnetic oscillator comprising:
   first and second input terminals for connection to a source of electric potential;
   magnetic timing means including a saturable magnetic core and a winding on said core having first and second end terminals and an intermediate tap;
   means, including a small resistance means, connecting said intermediate tap of said winding to said first input terminal;

a first and a second switching means each having a variable impedance conductive state and a nonconductive state, each said switching means having an input, an output, and a control means;

means connecting the output means of said first and said second switching means to said second input terminal;

means connecting the input means of said first switching means to the first end terminal of said winding, and means connecting the input means of said second switching means to the second end terminal of said winding;

network means interconnecting said switching means and said winding such that during the operation of the oscillator one of said two switching means is in its conductive state and the other of said switching means is in its nonconductive state and upon saturation of said magnetic core said two switching means assume their alternate states;

a first amplifier means having an input connected to receive a voltage signal from the second end terminal of said winding when said first switching means is in its conductive state, and having an output connected to the control means of said first switching means to vary the impedance of said first switching means as a function of the voltage appearing at said second end terminal; and a second amplifier means having an input connected to receive a voltage signal from the first end terminal of said winding when said second switching means is in its conductive state, and having an output connected to the control means of said second switching means to vary the impedance of said second switching means as a function of the voltage appearing at said first end terminal.

7. A magnetic oscillator comprising:

first and second input terminals for connection to a source of electric potential;

magnetic timing means including a saturable magnetic core and a winding on said core having first and second end terminals and an intermediate tap;

means connecting said intermediate tap of said winding to said first input terminal;

a first and a second transistor each having an input, an output, and a control electrode;

means connecting the output electrode of said first and said second transistors to said second input terminal;

means connecting the input electrode of said first transistor to the first end terminal of said winding, and means connecting the input electrode of said second transistor to the second end terminal of said winding;

biasing network means interconnecting said transistors and said winding such that during the operation of the oscillator one of said two transistors is in its nonsaturated conductive state and the other of said transistors is in its nonconductive state and upon saturation of said magnetic core said two transistors assume their alternate states;

a first amplifier means having an input connected to receive a voltage signal from the second end terminal of said winding when said first transistor is in its conductive state, and having an output connected to the control means of said first transistor to vary the conductivity of said first transistor as a function of the voltage appearing at said second end terminal; and a second amplifier means having an input connected to receive a voltage signal from the first end terminal of said winding when said second transistor is in its conductive state, and having an output connected to the control means of said second transistor to vary the impedance of said second transistor as a function of the voltage appearing at said first end terminal.

8. A magnetic oscillator comprising:

first and second input terminals for connection to a source of electric potential;

magnetic timing means including a saturable magnetic core and a winding on said core having first and second end terminals and an intermediate tap;

means, including a small resistance means, connecting said intermediate tap of said winding to said first input terminal;

a first and a second transistor each having an input, an output, and a control electrode;

means connecting the output electrode of said first and said second transistors to said second input terminal;

means connecting the input electrode of said first transistor to the first end terminal of said winding, and means connecting the input electrode of said second transistor to the second end terminal of said winding;

biasing network means interconnecting said transistors and said winding such that during operation of the oscillator one of said two transistors is in its nonsaturated conductive state and the other of said transistors is in its nonconductive state and upon saturation of said magnetic core said two transistors assume their alternate states;

a first amplifier means having an input connected to receive a voltage signal from the second end terminal of said winding when said first transistor is in its conductive state, and having an output connected to the control means of said first transistor to vary the conductivity of said first transistor as a function of the voltage appearing at said second end terminal; and a second amplifier means having an input connected to receive a voltage signal from the first end terminal of said winding when said second transistor is in its conductive state, and having an output connected to the control means of said second transistor to vary the impedance of said second transistor as a function of the voltage appearing across at said first end terminal.

9. A magnetic oscillator comprising:

first and second input terminals for connection to a source of electric potential;

magnetic timing means including a saturable magnetic core and a winding on said core having first and second end terminals and an intermediate tap;

means, including a small resistance means, connecting said intermediate tap of said winding to said first input terminal;

a first and a second transistor each having an input, an output, and a control electrode;

means connecting the output electrode of said first and said second transistor to said second input terminal;

means connecting the input electrode of said first transistor to the first end terminal of said winding, and means connecting the input electrode of said second transistor to the second end terminal of said winding;

biasing network means interconnecting said transistors and said winding such that during the operation of the oscillator one of said two transistors is in its nonsaturated conductive state and the other of said transistors is in its nonconductive state and upon saturation of said magnetic core said two transistors assume their alternate states;

a first amplifier means having an input connected to receive a voltage signal from the second end terminal of said winding when said first transistor is in its conductive state, and having an output connected to the control means of said first transistor to vary the conductivity of said first transistor as a function of the voltage appearing at said second end terminal;

a second amplifier means having an input connected to receive a voltage signal from the first end terminal of said winding when said second transistor is in its conductive state, and having an output connected to the control means of said second transistor to vary the impedance of said second transistor as a function of the voltage appearing at said first end terminal; and a source of control voltage connected across said winding between said intermediate tap and said end terminals, whereupon a change in said control voltage causes a corresponding change in the frequency of the oscillator.

References Cited

UNITED STATES PATENTS

| | | | |
|---|---|---|---|
| 3,147,406 | 9/1964 | Kotas | 331—113 X |
| 3,172,058 | 3/1965 | Freeborn | 331—113 |
| 3,172,059 | 3/1965 | Freeborn | 331—113 |
| 3,249,886 | 5/1966 | Anderson et al. | 331—113 X |

ROY LAKE, *Primary Examiner*.

J. B. MULLINS, *Assistant Examiner*.